US012536024B2

(12) United States Patent
Shah et al.

(10) Patent No.: US 12,536,024 B2
(45) Date of Patent: Jan. 27, 2026

(54) CROSS-PLATFORM MULTI-TRANSPORT REMOTE CODE ACTIVATION

(71) Applicant: Microsoft Technology Licensing, LLC, Redmond, WA (US)

(72) Inventors: Shrey Shah, Redmond, WA (US); Aidan George Purdy-Say, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/422,581

(22) Filed: Jan. 25, 2024

(65) Prior Publication Data

US 2024/0241731 A1  Jul. 18, 2024

Related U.S. Application Data

(63) Continuation of application No. 17/706,356, filed on Mar. 28, 2022, now Pat. No. 11,915,010.

(51) Int. Cl.
*G06F 9/4401* (2018.01)

(52) U.S. Cl.
CPC .......... *G06F 9/4416* (2013.01); *G06F 9/4418* (2013.01)

(58) Field of Classification Search
CPC .............................. G06F 9/4416; G06F 9/4418
See application file for complete search history.

(56) References Cited

U.S. PATENT DOCUMENTS

| 10,277,601 | B1 | 4/2019 | Higgins | |
|---|---|---|---|---|
| 2004/0049670 | A1* | 3/2004 | Miyamoto | ............ G06F 9/4416 713/2 |
| 2009/0030971 | A1* | 1/2009 | Trivedi | ................... H04L 67/06 709/203 |
| 2009/0319768 | A1* | 12/2009 | Ezaki | ..................... G06F 9/5077 713/310 |
| 2010/0273450 | A1* | 10/2010 | Papineau | ................ H04L 51/58 455/411 |
| 2015/0020013 | A1* | 1/2015 | Kim | ...................... G06F 3/0488 715/769 |
| 2015/0026448 | A1* | 1/2015 | Jiang | ..................... G06F 9/4416 713/2 |
| 2015/0054852 | A1* | 2/2015 | Ohnuma | ............ H04L 12/6418 345/635 |
| 2015/0256620 | A1* | 9/2015 | Sugano | ............... H04L 67/1095 709/217 |

(Continued)

OTHER PUBLICATIONS

Notice of Allowance mailed on Sep. 4, 2024, in U.S. Appl. No. 18/190,440, 11 pages.

*Primary Examiner* — Aurel Prifti

(57) ABSTRACT

In non-limiting examples of the present disclosure, systems, methods, and devices for cross-platform multi-transport remote code activation are provided. A first device operating on a first platform receives a wake initiation that indicates code for activation on a second device operating on a second platform. The first device identifies compatible transports for transmitting a wake message indicating the code for activation to the second device. The first device selects at least one transport and transmits the wake message over the transport to the second device. The second device, upon receiving the wake message, processes the wake message and activates the code, which was not executing prior to activating.

20 Claims, 9 Drawing Sheets

(56) References Cited

U.S. PATENT DOCUMENTS

| | | |
|---|---|---|
| 2016/0232365 A1 | 8/2016 | Oh |
| 2016/0239547 A1 | 8/2016 | Lim |
| 2016/0292404 A1 | 10/2016 | Tseng |
| 2017/0010790 A1 | 1/2017 | Glover et al. |
| 2019/0394308 A1* | 12/2019 | Balasubramanian ........................ H04L 69/164 |
| 2020/0081560 A1* | 3/2020 | Geller ................... G06F 1/3259 |
| 2020/0218522 A1* | 7/2020 | Shah ......................... G06F 8/61 |
| 2020/0241934 A1* | 7/2020 | Shah ..................... G06F 16/383 |
| 2020/0274919 A1* | 8/2020 | Shah ....................... G06F 9/452 |
| 2021/0042171 A1* | 2/2021 | Shah ....................... G06F 9/543 |
| 2021/0048933 A1* | 2/2021 | Shah .................. G06F 3/04883 |
| 2021/0050009 A1* | 2/2021 | Lo ........................... G06F 40/30 |
| 2021/0385193 A1* | 12/2021 | Sayyed ................. H04L 63/101 |

\* cited by examiner

CROSS-PLATFORM MULTI-TRANSPORT REMOTE CODE ACTIVATION

CROSS-REFERENCE TO RELATED APPLICATIONS

This application is a continuation of and claims priority to and the benefit of U.S. patent application Ser. No. 17/706,356, filed Mar. 28, 2022, titled "CROSS-PLATFORM MULTI-TRANSPORT REMOTE CODE ACTIVATION," which is incorporated herein by reference in its entirety for all purposes.

BACKGROUND

Computing devices have become ubiquitous in most aspects of life. It is now common for users to utilize at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms. Further, it is not uncommon for a user to have differing applications and functionality available for use on each of those devices. For example, a smartphone may have a camera application and hardware functionality that allows the user to easily capture photographs, and a desktop may have a powerful photo editing application that allows the user to touch up and otherwise edit photographs.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for remote code activation across computing platforms, devices, and operating system instances. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In examples, a computer-implemented method includes receiving, on a first device operating on a first platform, a wake initiation. The wake initiation indicates code for activation on a second device operating on a second platform. The method includes identifying, on the first device, multiple compatible transports for transmitting a wake message to the second device, where the wake message indicates the code for activation. The method further includes selecting, on the first device, one or more transports from the compatible transports for transmitting the wake message to the second device and transmitting it over the selected transports. The method includes receiving the wake message over the one or more transports at the second device and activating the code indicated in the wake message, where the code is not executing on the second device prior to activating the code based on the wake message. Other embodiments of this aspect include corresponding computer systems, apparatus, and computer programs recorded on one or more computer storage devices, each configured to perform the actions of the methods.

Implementations may include one or more of the following features. The computer-implemented method where the selecting the one or more transports from the compatible transports may include selecting the one or more transports based on one or more device characteristics of the first device. The one or more device characteristics may include at least one of a battery life, preference of a user of the first device and/or the remote device, a geographic location of the first device, a distance between the first device and the second device, or a combination thereof. The wake initiation may include one of a user input, a timer, or an event. The selecting the one or more transports may include selecting at least two transports, and the method further may include coalescing, by the second device, the wake message over the at least two transports to generate a single wake message. The code for activation may include a software application. The computer-implemented method may include validating, by the second device, an integrity of the wake message. The computer-implemented method may include transmitting, from the second device to the first device, a response to the wake message, and the response may include output from the code. The response may be transmitted over the one or more transports. The identifying a plurality of compatible transports may include identifying, by the first device, available transports on the second device; probing, by the first device, the first device for all available transports on the first device; and identifying matching transports between the first device and the second device. Identifying available transports on the second device may include inspecting a list of known available transports on the second device. Identifying available transports on the second device may include probing the second device for all available transports on the second device. Implementations of the described techniques may include hardware, a method or process, or computer software on a computer-accessible medium.

In another example, a system for remote code activation is described. The system includes a memory for storing executable program code, and a processor, functionally coupled to the memory, the processor being responsive to computer-executable instructions contained in the program code and operative to receive a wake initiation, where the wake initiation indicates code for activation on a remote system operating on a different platform than the system. The instructions may be further operative to identify multiple compatible transports for transmitting a wake message to the remote system, the wake message indicating the code for activation. The instructions may be further operative to select one or more transports from the compatible transports for transmitting the wake message to the remote system. The instructions may be further operative to transmit the wake message over the one or more transports to the remote system, where the wake message is processed by the remote system to activate the code indicated in the wake message, and where the code is not executing on the remote system prior to the activating. Other embodiments of this aspect include corresponding computer systems, apparatus, and computer programs recorded on one or more computer storage devices, each configured to perform the actions of the methods.

Implementations may include one or more of the following features. The system where the computer-executable instructions contained in the program code that make the processor operative to select the one or more transports from the plurality of compatible transports may include further computer-executable instructions that make the processor operative to select the one or more transports based on one or more device characteristics of the system. Optionally, the wake initiation may include one of a user input, a timer, or an event. Optionally, the code for activation may include a software application. Optionally, the computer-executable instructions contained in the program code that make the processor operative to identify the compatible transports may include further computer-executable instructions that make the processor further operative to identify available transports on the remote system, probe the system for all available transports on the system, and identify matching transports between the system and the remote system. Implementations of the described techniques may include hardware, a method or process, or computer software on a computer-accessible medium.

In another example, a system for remote code activation is described. The system includes a memory for storing executable program code, and a processor, functionally coupled to the memory, the processor being responsive to computer-executable instructions contained in the program code and operative to receive a wake message over at least two transports from a remote system operating on a different platform than the system. The instructions may be further operative to coalesce the wake message from the at least two transports to generate a single wake message, the wake message indicating code for activation on the system. The instructions may be further operative to activate the code indicated in the wake message, where the code is not executing prior to activating. Other embodiments of this aspect include corresponding computer systems, apparatus, and computer programs recorded on one or more computer storage devices, each configured to perform the actions of the methods.

Implementations may include one or more of the following features. The system where the computer-executable instructions contained in the program code may include further computer-executable instructions that make the processor operative to validate an integrity of the wake message. The computer-executable instructions contained in the program code may include further computer-executable instructions that make the processor operative to transmit, to the remote system, a response to the wake message, and the response may include output from the code. Implementations of the described techniques may include hardware, a method or process, or computer software on a computer-accessible medium.

BRIEF DESCRIPTION OF THE DRAWINGS

Non-limiting and non-exhaustive examples are described with reference to the following figures.

DETAILED DESCRIPTION

Figure 1:
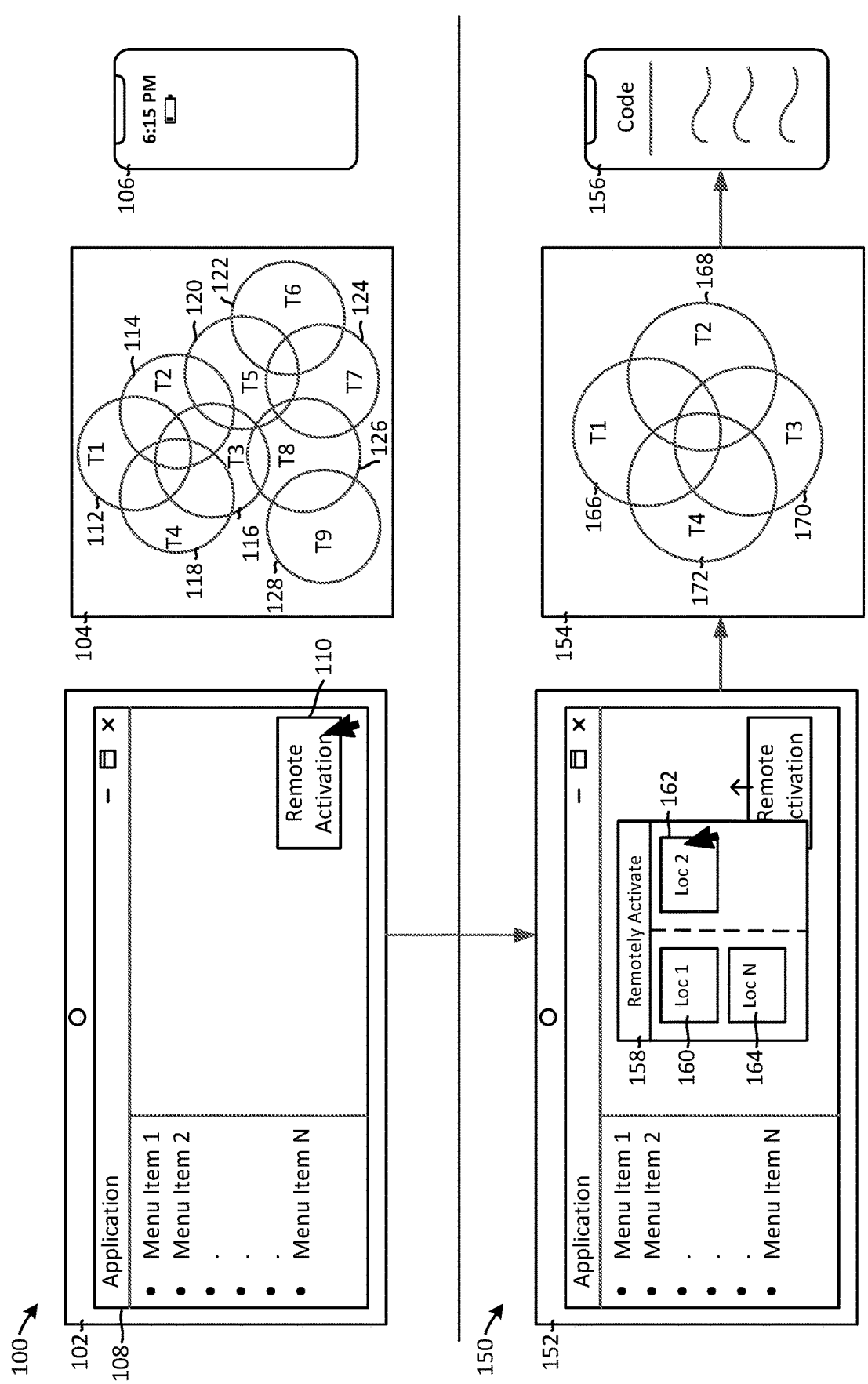
FIG. 1 is a schematic diagram illustrating an example computing environment for utilizing cross-platform multi-transport remote code activation.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for multi-transport remote code activation between devices that have differing platforms. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

As used herein, "transport" describes a protocol or carrier for communication between devices. Transports may include, for example, BLUETOOTH®, near-field communication (NFC) or other near-field transports, an infrastructure network such as a cellular network, a satellite network, or a cable network, cloud/push, and the like.

According to examples, a first computing device operating on a first platform may receive a wake initiation that indicates code for activation on a second device operating on a second platform. The wake initiation may an operation that requires the code on the second device to wake up. The wake initiation may be, for example, from a user input, time based, or event based. The first device may identify compatible transports for transmitting a wake message to the second device. The wake message may be generated based on the wake initiation. For example, the wake message may indicate the code for activation. The payload of the wake message may also include, for example, parameters or other input for the code to use while executing. The compatible transports may be all transports supported by both the first device and the second device that the two devices can use to communicate. For example, transports may include BLUETOOTH®, NFC, other near-field transports, a cellular network, a cable network, cloud/push, a satellite network, or the like. The first device may select one or more transports from the compatible transports for transmitting the wake message to the second device. The transports may be selected based on device characteristics of the first device, the second device, or both devices. Device characteristics may include, for example, battery life, geographic location, distance between the first and second devices, user preference of the remote and/or transmitting device, and the like. Once the transport(s) are selected, the first device may transmit the wake message over the one or more transports to the second device.

At the second device, the wake message may be received over the one or more transports. If more than one transport was used, the second device may receive multiple wake messages. The second device may coalesce the wake messages over the multiple transports to generate a single wake message. By coalescing the wake messages, the second device will process only one wake message rather than the same wake message processing multiple times. The second device may optionally validate the integrity of the wake message. For example, if the selected transport does not include security, the second device may perform integrity checking on the wake message to ensure it is not malicious, for example. The second device may then dispatch the payload of the wake message for processing so that the code indicated in the wake message is activated. The code is not executing on the second device until the wake message is processed and the code is activated. For example, the second device may determine that the wake message indicates that a software application should execute, and in response to processing the wake message, the second device launches the software application (i.e., activates the code). The code may be a software application or lower-level code. The second device may optionally respond to the wake message with output from the code.

The systems, methods, and devices described herein provide technical advantages for remote activation of code across platforms and transports. Memory costs associated with storing multiple instances of applications (a same application on each device) are greatly reduced in that a user may access code on a second computing device from a first computing device. Further, many applications are not supported on all platforms, so the ability to utilize one device having an application that cannot be executed or is not practical to execute on a second device provides technical advantages for a user. For example, a powerful photo editing software is not likely available for use on a tablet or smartphone, but a laptop or desktop computer may support such an application. Further, the ability to have a screen large enough to do detailed work would limit the usefulness of such an application on a smartphone, for example. Yet, capturing the images is much easier on a smartphone or even a tablet than on a laptop, and a desktop may not even have camera hardware installed. Accordingly, the ability to use the desktop computer to execute the photo editing application and remotely activate the image gallery on the smartphone to access the images provides a technical advantage to the user.

Processing and speed costs associated with communicating between the devices are reduced by the multi-transport functionality described. The multi-transport functionality provides the capability for the device to determine, on the fly, which transport is best suited for handling the communication. This may for example, increase the speed of the data exchange. For example, the fastest available transport may be selected. Additionally, the transport selection may use device characteristics to identify the optimal transports for communication. For example, battery life, geographic location, distance between devices, and the like may be used to determine which transport is optimal. A high power (i.e., high battery-use) transport may not be used when the battery life is low, for example. This type of intelligent transport selection helps increase not only the speed of communication, but the overall user experience.

The multi-platform functionality allows the user to remotely activate code without being locked into a single platform for all devices. There is also a technical advantage to activating code remotely, which allows a user to launch applications and code on a second device without interacting with the second device.

FIG. 1 is a schematic diagram illustrating an example computing environment 100 and example computing environment 150 for remotely activating code. Computing environment 100 includes computing device 102, communication transports 104, and computing device 106. Computing environment 150 includes computing device 152, communication transports 154, and computing device 156. Computing devices 102 and 152 are the same computing device, with computing device 152 displaying the result of the remote activation button 110. Similarly, computing devices 106 and 156 are the same device with computing device 156 displaying code activated as a result of previous operations performed in computing environments 100 and 150. Communication transports 154 is a subset of communication transports 104 as will be described in more detail below.

Computing device 102 may be any computing device including a smartphone, tablet, laptop, desktop, or the like. Computing device 102 may be any of mobile computing device 600 as described with respect to FIG. 6, mobile computing device 700 as described with respect to FIG. 7, or computing device 800 as described with respect to FIG. 8. Computing device 102 may be operating on a first platform. For example, the hardware configuration, type of device, and operating system of computing device 102 may be a first configuration. Computing device 102 may have a software application 108 that may be executing. The software application 108 may have a remote activation button 110 that initiates a remote code activation on a second device. Computing device 102 may also include wake transmission code (not shown) that is initiated when the remote activation button 110 is selected. The wake transmission code is described in more detail with respect to FIG. 2. The software application 108 may be any software application that a user interacts with that may have integrated a call to the wake transmission code. In some embodiments, initiating the wake transmission code may be time based or event based rather than user initiated. For example, the wake transmission code may be activated hourly, once per day, or any other time interval for activating code on a remote device.

Communication transports 104 includes communication transport T1 112, T2 114, T3 116, T4 118, T5 120, T6 122, T7 124, T8 126, T9 128. The communication transports 104 represent all communication transports available to one or both of computing devices 102 and 106. The communication transports may include, for example, BLUETOOTH®, NFC, other near-field transports, cable networks, cellular networks, satellite networks, cloud/push, and the like.

Computing device 106 may be any computing device including a smartphone, tablet, laptop, desktop, or the like. Computing device 102 may be any of mobile computing device 600 as described with respect to FIG. 6, mobile computing device 700 as described with respect to FIG. 7, or computing device 800 as described with respect to FIG. 8. Computing device 106 may be operating on a second platform different from the first platform on which computing device 102 is operating. For example, the hardware may be different between computing devices 102 and 106. Computing device 102 may be a desktop computer and computing device 106 may be a smartphone. As another example, the operating system may be different between computing devices 102 and 106. Computing device 102 may be using a WINDOWS® operating system, and computing device 106 may be using an ANDROID® operating system, for example. In some scenarios, both the hardware configuration and the operating system are different between computing devices 102 and 106. Computing device 106 may also include wake receiver code (not shown) that is initiated when a wake message is transmitted on one or more transports from communication transports 104. The wake receiver code is described in more detail with respect to FIG. 3.

Computing device 152 is the same as computing device 102. Computing device 156 is the same as computing device 106. Communication transports 154 includes a subset of communication transports 104.

In use, a user using computing device 102 executes software application 108. The user also has computing device 106. The available communication transports are available in communication transports 104. The user selects the remote activation button 110. The remote activation window 158 pops open in response to selection of the remote activation button 110. The remote activation window 158 may include any number of remote devices on which to activate remote code. The remote activation window 158 shown includes location 1 160, location 2 162, and location N 164. The user may select location 2 162, for example, which corresponds to computing device 106, 156. The wake transmission code (not shown) is initiated. The wake transmission code identifies compatible transports between computing devices 152 and 156 from the communication transports 104. In the example shown, communication transports T1 166, T2 168, T3 170, and T4 172 are the compatible communication transports as shown in communication transports 154. Computing device 152 selects one or more of the communication transports 154 to transmit the wake message over to computing device 156.

Computing device 156 receives the wake message over the selected transports. The wake message initiates the wake receiver code (not shown). The wake receiver code processes the wake message. For example, if more than one transport was selected, the wake receiver code coalesces the wake messages into a single wake message. As another example, the wake receiver code may secure the wake message by, for example validating the integrity of the wake message. The wake receiver code dispatches the payload of the wake message to activate the code identified in the wake message. As shown, the code is now active on computing device 156. Prior to the activation, the code was not executing or active on computing device 156.

The following figures provide more details of the wake transmission code, the wake receiver code, and additional examples of remote code activation.

Figure 2:
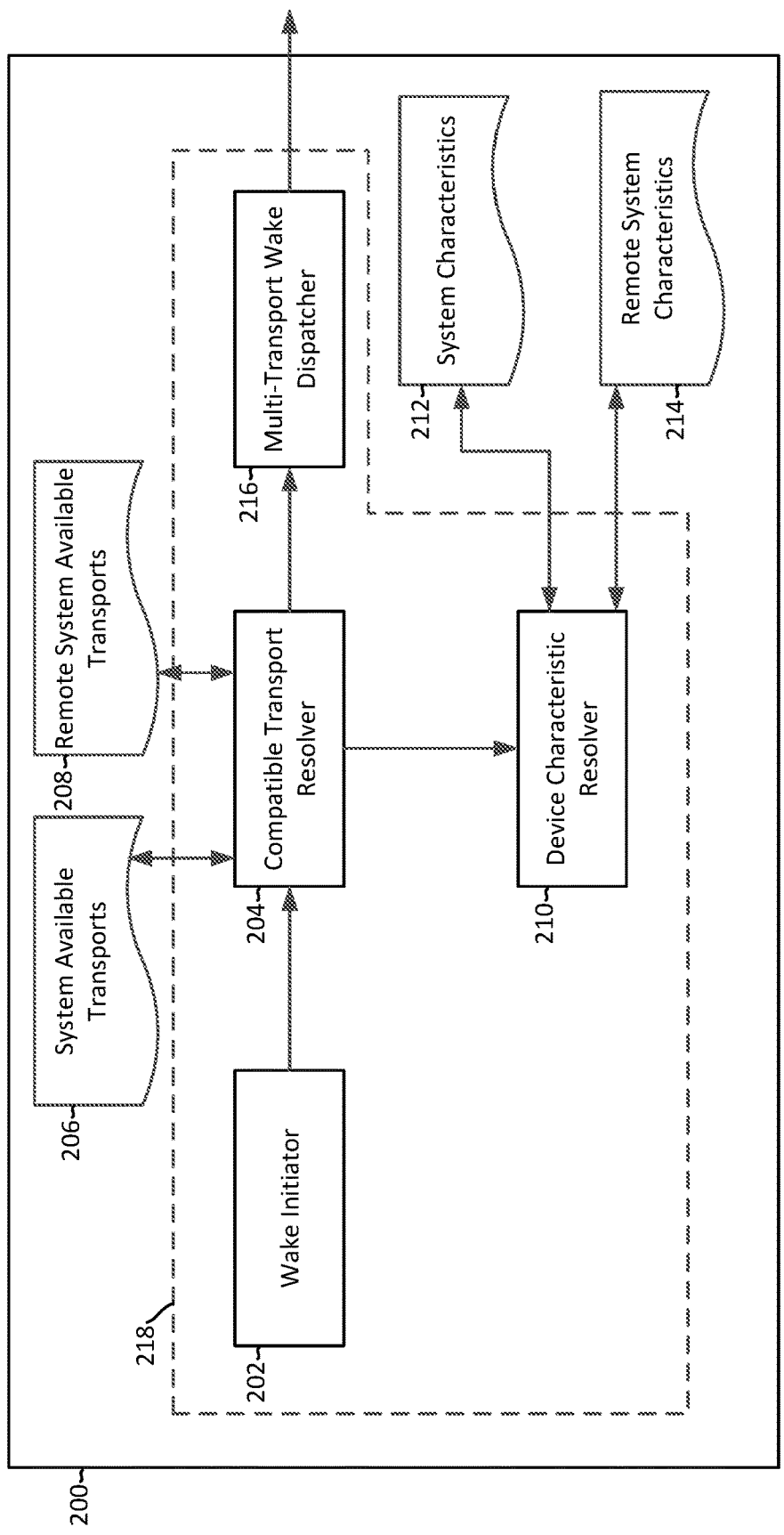
FIG. 2 is a schematic diagram illustrating an example transmission device.

FIG. 2 is a simplified block diagram illustrating an exemplary transmitting device 200. Transmitting device 200 may be, for example, computing device 102 and 152 as described with respect to FIG. 1. The process described with respect to transmitting device 200 includes the functionality of the wake transmission code 218 discussed with respect to FIG. 1. While transmitting device 200 is described with respect to the wake transmission code 218, it may also include the wake receiver code to provide both transmission and reception functionality.

Transmitting device 200 includes the wake transmission code 218 including wake initiator 202, compatible transport resolver 204, device characteristic resolver 210, and multi-transport wake dispatcher 216. Transmitting device 200 may also include system available transports 206, remote system available transports 208, system characteristics 212, and remote system characteristics 214. The diagram shown is provided for explanation of the functionality described. The functionality may be divided into more or fewer components than shown.

In some embodiments, configuring the wake transmission code 218 for remote devices is done upon first instantiation, when a new remote device needs to be configured, or both. Configuring a new device may include identifying the remote device, probing the remote device for available transports it supports, probing the remote device for device characteristics, and probing the remote device for code available for activation. For example, a user may obtain a new smartphone that the user would like to access from the transmitting device 200. The user may identify the smartphone to the wake transmission code 218 using, for example, a user interface (not shown). The wake transmission code 218 may store the smartphone identifier (e.g., MAC address) in a list of available remote devices. The wake transmission code 218 may probe the remote device for all available supported transports and store the information in the remote system available transports 208. The wake transmission code 218 may probe the remote device for device characteristics and store the information in the remote system characteristics 214. The wake transmission code 218 may probe the remote device for available code for remote activation. In some embodiments, the user may be given a list of applications and other code available for remote activation that the user may select for remote activation. The available code or selected code may be stored by the wake transmission code 218 so that the remote code available for activation is known by the transmitting device 200. In this way, some information is known about the remote device when a call comes to the wake initiator 202 for a wake to the remote device. The available remote devices may then be used when, for example, the user may be given a list of available remote devices to select from, such as remote activation window 158 as described with respect to FIG. 1.

The wake initiator 202 may provide a callable function or application programming interface (API) so that a software application or other software code can initiate a wake message using the wake initiator 202. The wake initiator 202 may be called by a software application or lower-level code. The call may be time based (e.g., every two hours), event based (e.g., on startup of the transmitting device 200), or user initiated (e.g., by clicking a button in a software application). The call to the wake initiator 202 may include an indication of the code to be activated, the device on which to activate the code, and any other payload information that may be used or needed for the code activation.

The compatible transport resolver 204 uses the information provided to the wake initiator 202 to resolve the compatible transports. For example, the call to the wake initiator 202 may include the remote device identifier. The compatible transport resolver 204 may access the system available transports 206 and the remote system available transports 208 to identify all matching transports that are available to both the transmitting device 200 and the remote device. The compatible transport resolver 204 may use the remote device identifier to find corresponding entries in the remote system available transports 208, for example. While depicted as a file, each of the system available transports 206 and the remote system available transports 208 may be stored in a database or any other storage format. Optionally, rather than storing the information, the available transports for the transmitting device 200 may be identified by probing the transmitting device 200, and/or the available transports for the remote device may be identified by probing the remote device.

Optionally, the device characteristics of the transmitting device 200 or the remote device may be used to select the optimal transports for transmitting the wake message to the remote device. The device characteristic resolver 210 may identify the characteristics or the characteristics of relevance under the current circumstances to use for selecting the transport(s). For example, geographic location may impact the transport selection because the user may be near a signal noisy location, which may impact some transports more than others. As another example, the distance between the transmitting device 200 and the remote device may impact the transport selection because, for example, if the two devices are very near each other, a near-field transport may be the most efficient, but if the two devices are at the edge of being close enough for a near-field transmission, a different transport may be deemed more efficient or effective. To obtain the device characteristics of the transmitting device 200, the device characteristic resolver 210 may access system characteristics 212. To obtain the characteristics of the remote device, the device characteristic resolver 210 may access remote system characteristics 214. While depicted as a file, each of the system characteristics 212 and the remote system characteristics 214 may be stored in a database or any other storage format. Optionally, rather than storing the information, the characteristics for the transmitting device 200 may be identified by probing the transmitting device 200, and/or the characteristics for the remote device may be identified by probing the remote device. Optionally, the device characteristics of the transmitting device 200 may be used without considering the characteristics of the remote device or vice versa.

The compatible transport resolver 204 may transmit the information regarding the wake initiation, the compatible transports, and the device characteristics to the multi-transport wake dispatcher 216. The multi-transport wake dispatcher 216 may determine one or more transports over which to transmit the wake message to the remote device. In some embodiments, the multi-transport wake dispatcher 216 may use an artificial intelligence model to identify which one or more of the compatible transports to use for the wake message. The artificial intelligence model may use the device characteristics of the transmitting device 200 and/or the remote device as input as well as the compatible transports to select the optimal transports for transmitting the wake message. As another example, the transports may be selected based on a ranked list of transports. As another example, the selection of the transports may be made using a rules-based system. Optionally, the number of transports used to transmit the wake message may be pre-determined or may be a percentage of the compatible transports, for example. As another example, each transport may be scored based on how optimal the transport would be given, for example, the device characteristics of the transmitting device 200 and/or the remote device. Transports to use may be selected based on the score exceeding a threshold value. Once the transports are selected, the multi-transport wake dispatcher 216 generates the wake message with payload that includes an indication of the code to be activated as well as any parameters to be used with the code. The wake message may be a device and platform agnostic message. The wake message may be packaged into any format for transmission on the selected transports. The multi-transport wake dispatcher 216 transmits the wake message on each of the selected transports to the remote device.

Figure 3:
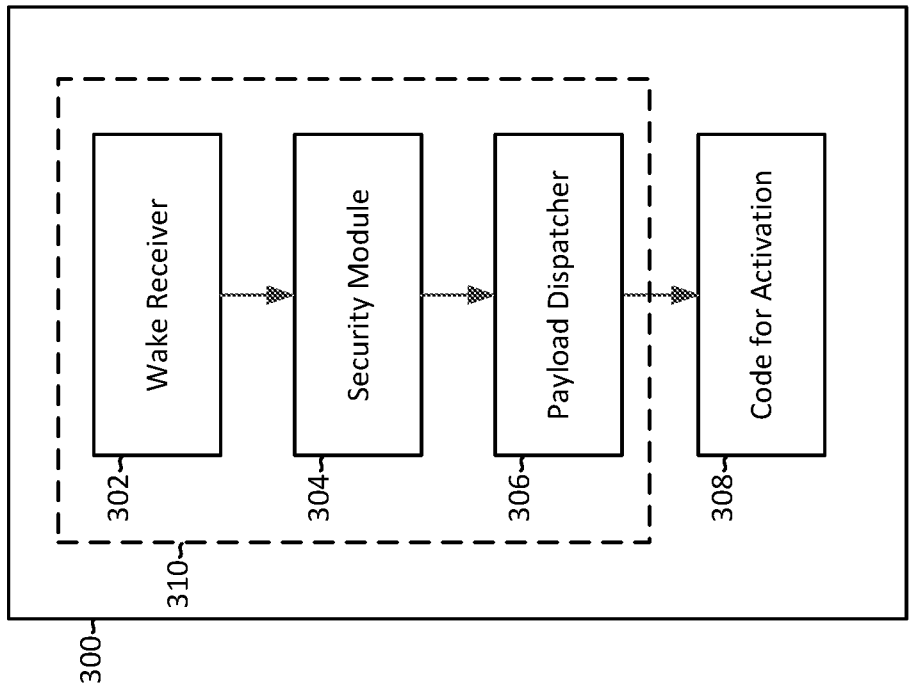
FIG. 3 is a schematic diagram illustrating an example receiving device.

FIG. 3 is a simplified block diagram of a receiving device 300. Receiving device 300 may be, for example, computing device 106 and 156 as described with respect to FIG. 1. The process described with respect to receiving device 300 includes the functionality of the wake receiver code 310 discussed with respect to FIG. 1. While receiving device 300 is described with respect to the wake receiver code 310, it may also include the wake transmission code 218 to provide both transmission and reception functionality.

Receiving device 300 includes the wake receiver code 310 including wake receiver 302, security module 304, and payload dispatcher 306. Receiving device 300 also includes code for activation 308. The diagram shown is provided for explanation of the functionality described. The functionality may be divided into more or fewer components than shown.

The wake receiver 302 may be a software component that is natively integrated into the operating system such that it may be woken by a message from any of multiple transports. Upon receipt of the wake message, the wake receiver 302 wakes up to process the wake message. In some cases, the transmitting device (e.g., transmitting device 200) transmits the wake message on more than one transport. In such cases, the wake receiver 302 coalesces the wake messages into a single wake message so that the receiving device 300 processes the wake message only once.

The security module 304 may optionally provide security for the wake message. For example, the security module 304 may check that the transport used for the wake message is secure. If a non-secure transport is used, the security module 304 may perform integrity checking on the wake message to ensure it is not, for example, malicious.

The payload dispatcher 306 may process the wake message to activate the code indicated in the wake message. For example, the payload dispatcher 306 may identify the code for activation 308 in the wake message. In some embodiments, the receiving device 300 may have many different applications or other code that can be remotely activated using the present methods and systems. The payload dispatcher 306 may process the wake message to identify the indicated code as well as any parameters sent for use in the activated code. The payload dispatcher 306 may activate the indicated code for activation 308 such that the processor of receiving device 300 executes the code for activation 308 using any parameters provided in the wake message. The code for activation 308 may be any software application or other code in receiving device 300. For example, the code for activation 308 may be a command to tell the receiving device 300 to take some action, may send a payload to some application, may request a response, and/or the like. The code for activation 308 is not activated or executing prior to being activated based on the wake message. For example, if the code for activation 308 is a software application, the software application is not launched, active, or otherwise executing prior to activation based on the wake message.

In some embodiments, if the code for activation 308 provides a response or a response is requested in the wake message, the return communication may be across the same selected transport(s), may use the same process with the receiving device 300 executing the wake transmission code 218 to select the transports, or may simply reply on a different transport.

Figure 4:
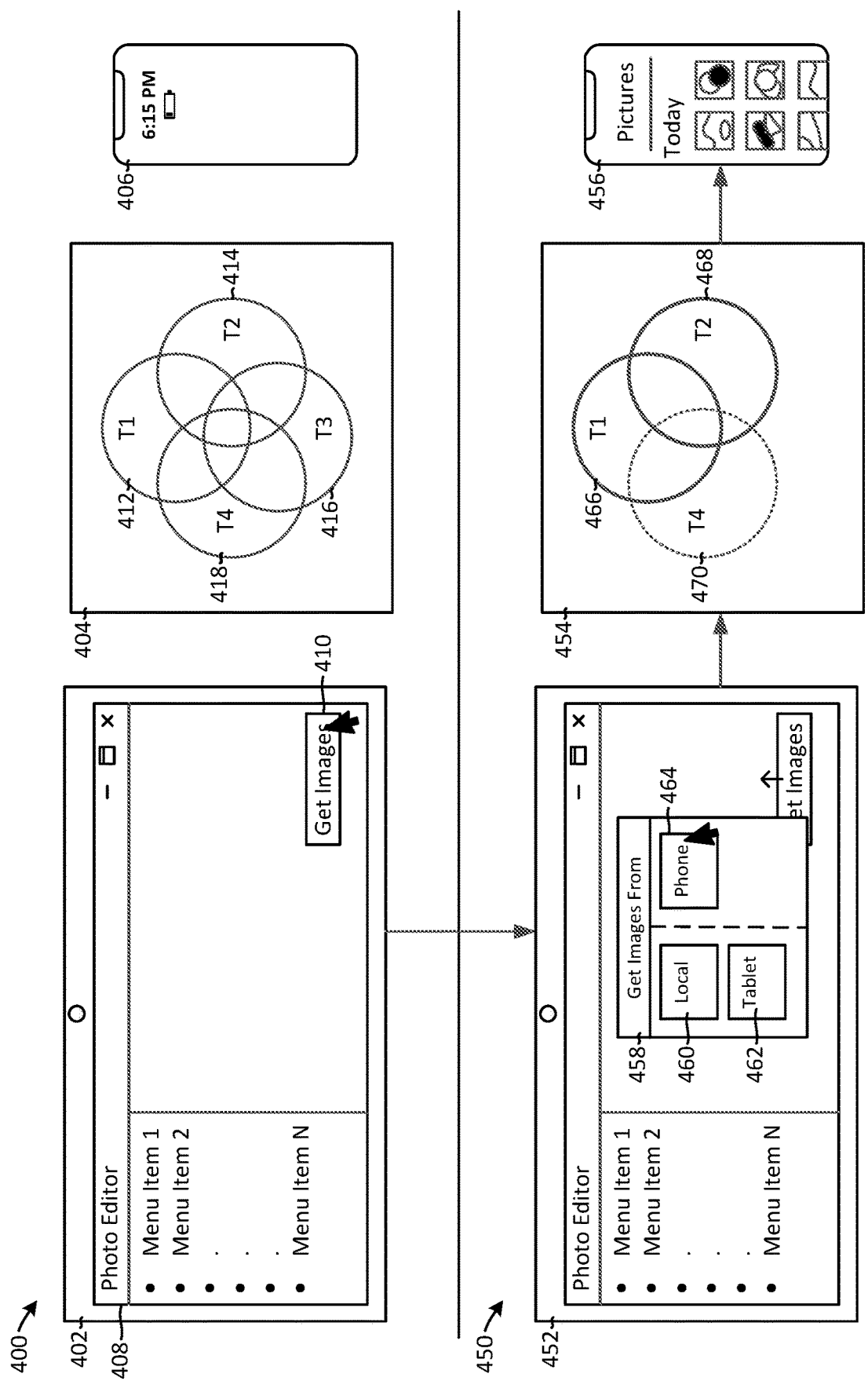
FIG. 4 is a simplified diagram of two devices with which aspects of the disclosure may be practiced.

FIG. 4 is a is a diagram illustrating an example computing environment 400 and example computing environment 450 for remotely activating code. Computing environment 400 includes computing device 402, communication transports 404, and computing device 406. Computing environment 450 includes computing device 452, communication transports 454, and computing device 456. Computing devices 402 and 452 are the same computing device, with computing device 452 displaying the result of the Get Images button 410. Similarly, computing devices 406 and 456 are the same device with computing device 456 displaying the image gallery application activated as a result of previous operations performed in computing environments 400 and 450. Communication transports 454 is a subset of communication transports 404 as will be described in more detail below.

Computing device 402 may be, for example, a desktop or laptop. Computing device 402 may be computing device 800 as described with respect to FIG. 8. Computing device 402 may be operating on a first platform. For example, the hardware configuration, type of device, and operating system of computing device 402 may be a first configuration. Computing device 402 may have a photo editing application 408 that may be executing. The photo editing application 408 may have a Get Images button 410 that initiates a remote code activation on a second device to launch an image gallery and obtain images. Computing device 402 may also include wake transmission code (e.g., wake transmission code 218) that is initiated when the Get Images button 410 is selected. The photo editing application 408 may have integrated a call to the wake transmission code upon entry of the Get Images button 410. In some embodiments, the same image request could be also based on time or event. For example, a call to the wake transmission code may be made every hour. As another example, launching the photo editing application 408 may call the wake transmission code.

Communication transports 404 includes communication transport T1 412, T2 414, T3 416, and T4 418. The communication transports 404 represent all communication transports available to one or both of computing devices 402 and 406. The communication transports may include, for example, BLUETOOTH®, NFC, other near-field transports, cable networks, cellular networks, satellite networks, cloud/push, and the like.

Computing device 406 may be a smartphone or a tablet, for example. Computing device 402 may be any of mobile computing device 600 as described with respect to FIG. 6 or mobile computing device 700 as described with respect to FIG. 7. Computing device 406 may be operating on a second platform different from the first platform on which computing device 402 is operating. For example, the hardware may be different between computing devices 402 and 406. Computing device 402 may be a desktop computer and computing device 406 may be a smartphone. As another example, the operating system may be different between computing devices 402 and 406. Computing device 402 may be using a WINDOWS® operating system, and computing device 406 may be using an ANDROID® operating system, for example. In some scenarios, both the hardware configuration and the operating system are different between computing devices 402 and 406. In some scenarios only the operating systems differ. Computing device 406 may also include wake receiver code (e.g., wake receiver code 310) that is initiated when a wake message is transmitted on one or more transports from communication transports 404.

Computing device 452 is the same as computing device 402. Computing device 456 is the same as computing device 406. Communication transports 454 includes a subset of communication transports 404.

In use, a user using computing device 402 executes the photo editing application 408. The user also has computing device 406. The available communication transports are available in communication transports 404. The user selects the Get Images button 410. The Get Images From window 458 pops open in response to selection of the Get Images button 410. The Get Images From window 458 may include any number of remote devices on which to activate remote code. For example, any registered remote devices that include a gallery application from which to obtain images may be listed in the Get Images From window 458. The Get Images From window 458 shown includes Local 460, Tablet 462, and Phone 464. The user may select Phone 464, for example, which corresponds to computing device 406, 456. The wake transmission code (e.g., wake transmission code 218) is initiated. The wake transmission code identifies compatible transports between computing devices 452 and 456 from the communication transports 404 using the compatible transport resolver. In the example shown, communication transports T1 466, T2 468, and T4 470 are the compatible communication transports as shown in communication transports 454. Using the multi-transport wake dispatcher, the computing device 452 selects T1 466 and T2 468 from communication transports 454 to transmit the wake message over to computing device 456.

The wake receiver in computing device 456 receives the wake message over the T1 466 and T2 468 selected transports. The wake message initiates the wake receiver code (e.g., wake receiver code 310). The wake receiver coalesces the two wake messages to have a single wake message that indicates the image gallery application as the code to activate. In some embodiments, a security module may secure the wake message by, for example validating the integrity of the wake message. The payload dispatcher identifies the image gallery application and launches the image gallery application as shown on computing device 456. Prior to the activation, the image gallery was not executing or active on computing device 456. In some embodiments, for example, all new images collected are transmitted back to the computing device 452. In some embodiments, as another example, a device mirroring application is also launched so that the user on computing device 452 may use the device mirroring to identify the images to pull from computing device 456 to computing device 452.

Figure 5:
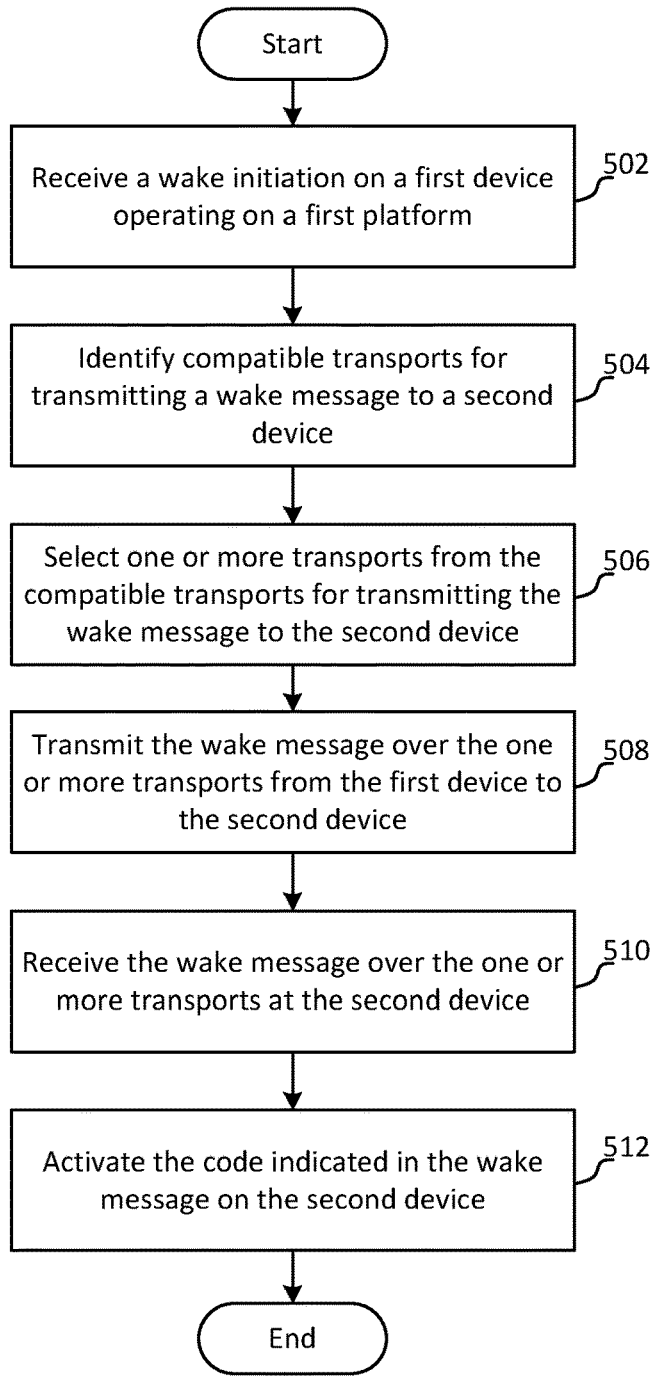
FIG. 5 is an exemplary method for cross-platform multi-transport remote code activation.

FIG. 5 is an exemplary method 500 for multi-platform, multi-transport remote code activation. The method 500 begins at a start operation and flow moves to operation 502.

At operation 502 a first computing device operating on a first platform receives a wake initiation. The wake initiation may include an indication of code on a remote device for activation. The wake initiation may be from a user action, event based, or time based.

From operation 502 flow continues to operation 504 where the first device identifies compatible transports for transmitting a wake message to the second device. For example, a compatible transport resolver (e.g., compatible transport resolver 204) may identify all matching transports available to both the first device and the second device. For example, if both devices have BLUETOOTH® capability, it would be a compatible transport.

From operation 504 flow continues to operation 506 where the first device selects one or more transports from the compatible transports for transmitting the wake message to the second device. For example, a device characteristic resolver (e.g., device characteristic resolver 210) may provide device characteristics for the first and/or second device, and the compatible transport resolver may provide the compatible transports to a multi-transport wake dispatcher (e.g., multi-transport wake dispatcher 216). The multi-transport wake dispatcher may select the optimal transports for transmitting the wake message. The multi-transport wake dispatcher may also generate the platform and transport agnostic wake message from the wake initiation information. The wake message may include an indication of the code for activation, parameters for use with the code, an indication of whether a response is required, and so forth.

From operation 506 flow continues to operation 508 where the first device transmits the wake message to the second device over the selected transports.

In some embodiments, operation 508 is the end of the method 500. In such embodiments, operation 510 begins a new method on the remote device (i.e., receiving device, second device). At operation 510, the second device receives the wake message over the one or more transports. A wake receiver (e.g., wake receiver 302) wakes up to process the wake message. The wake receiver may coalesce the wake messages from multiple transports to generate a single wake message.

From operation 510 flow continues to operation 512 where the second device activates the code indicated in the wake message on the second device. Optionally, before the code is activated, a security module may ensure that the wake message is secure by, for example, checking that the transport used to transmit the wake message was a secure transport. In some embodiments, the security module may validate the integrity of the wake message, particularly if the wake message was received over a non-secure transport. A payload dispatcher (e.g., payload dispatcher 306) may identify the code for activation and launch the code including any parameters or other information needed from the wake message. In some embodiments, a response is transmitted back to the first device.

Figure 6:
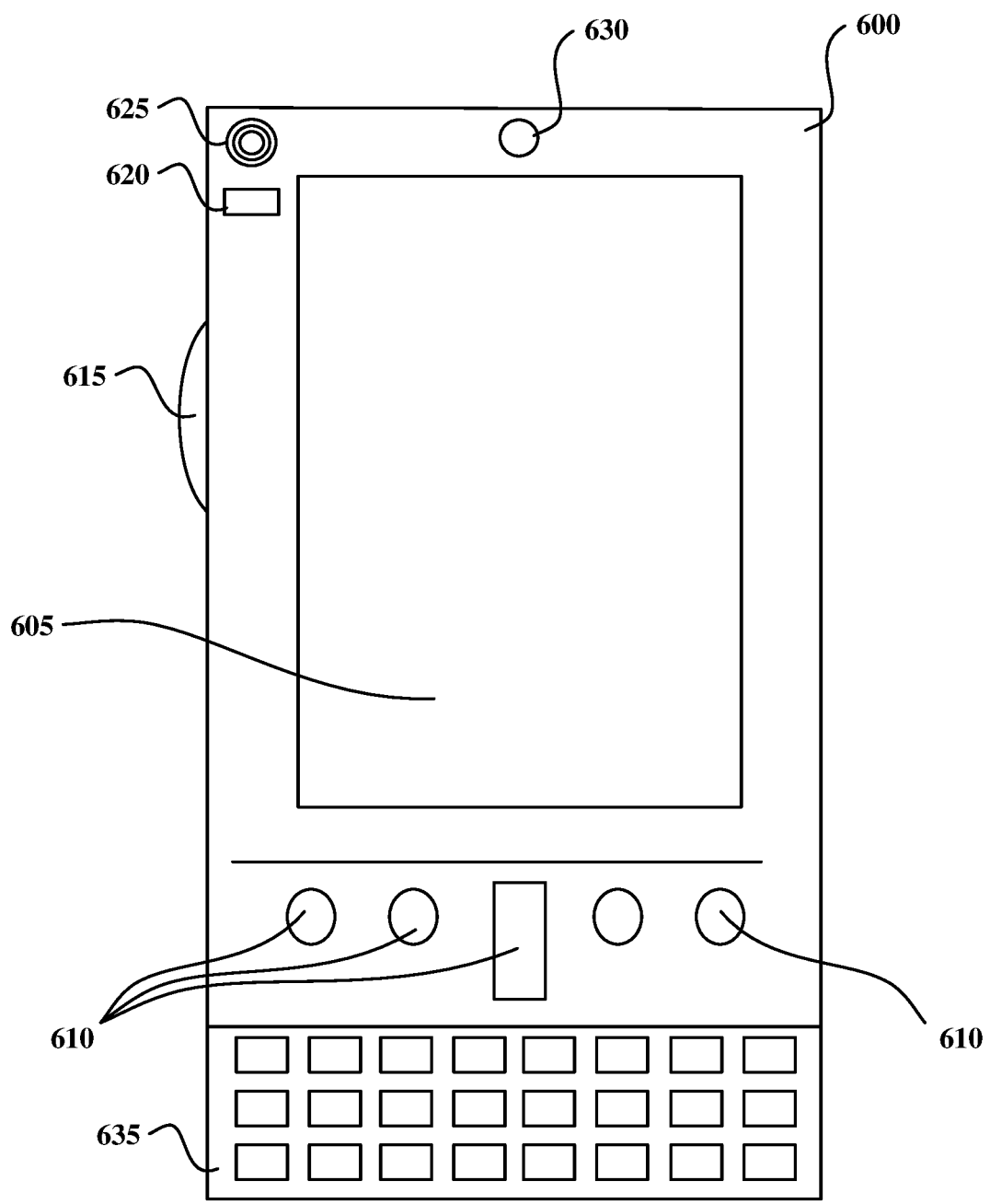
FIGS. 6 and 7 are simplified diagrams of a mobile computing device with which aspects of the disclosure may be practiced.
Figure 7:
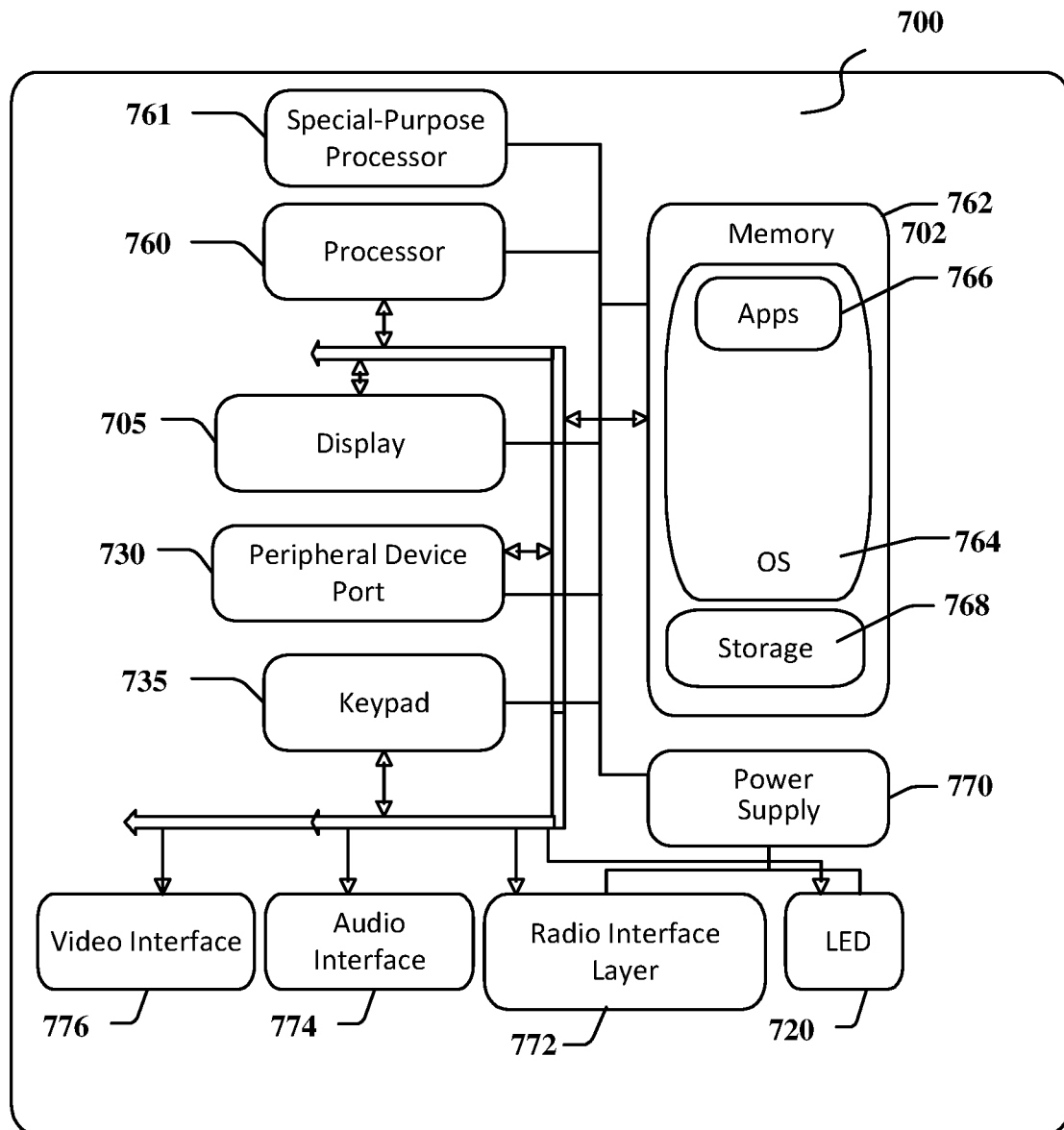

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a focus state notification platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated, such data/information may be accessed via the mobile computing device 700, via the radio interface layer 772, or via a distributed computing network. Similarly, such data/information may be readily transferred between computing devices for storage and use according to well-known data/information transfer and storage means, including electronic mail and collaborative data/information sharing systems.

Figure 8:
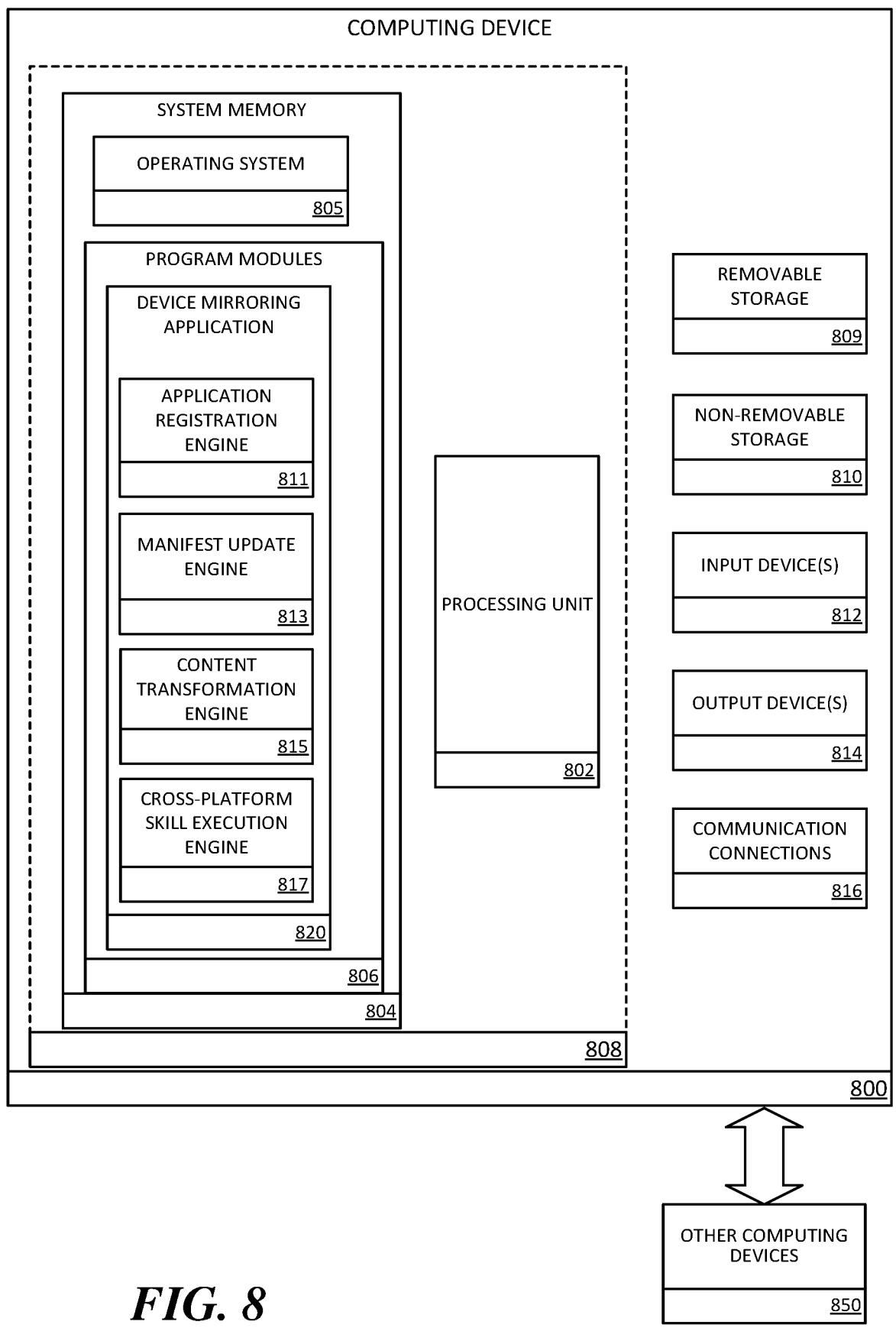
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for performing operations associated with a device mirroring application. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more application programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., device mirroring application 820) may perform processes including, but not limited to, the aspects, as described herein. According to examples, application registration engine 811 may perform one or more operations associated with identifying, from a first computing device, one or more applications and associated computing skills that are executable by a second computing device, and saving information related to those applications and/or computing skills to the first computing device. Manifest update engine 813 may perform one or more operations associated with determining whether an application manifest is up to date with properties and/or attributes of applications and computing skills executable by a second device and updating the application manifest on a first computing device. Content transformation engine 815 may perform one or more operations associated with transforming digital content from a first format from a first computing device to a second normalized format that is readable and/or executable by a second computing device that is going to perform an action associated with that content. Cross-platform skill execution engine 817 may perform one or more operations associated with receiving digital content from a first computing device and executing a computing skill with an application on a second computing device in association with that digital content.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
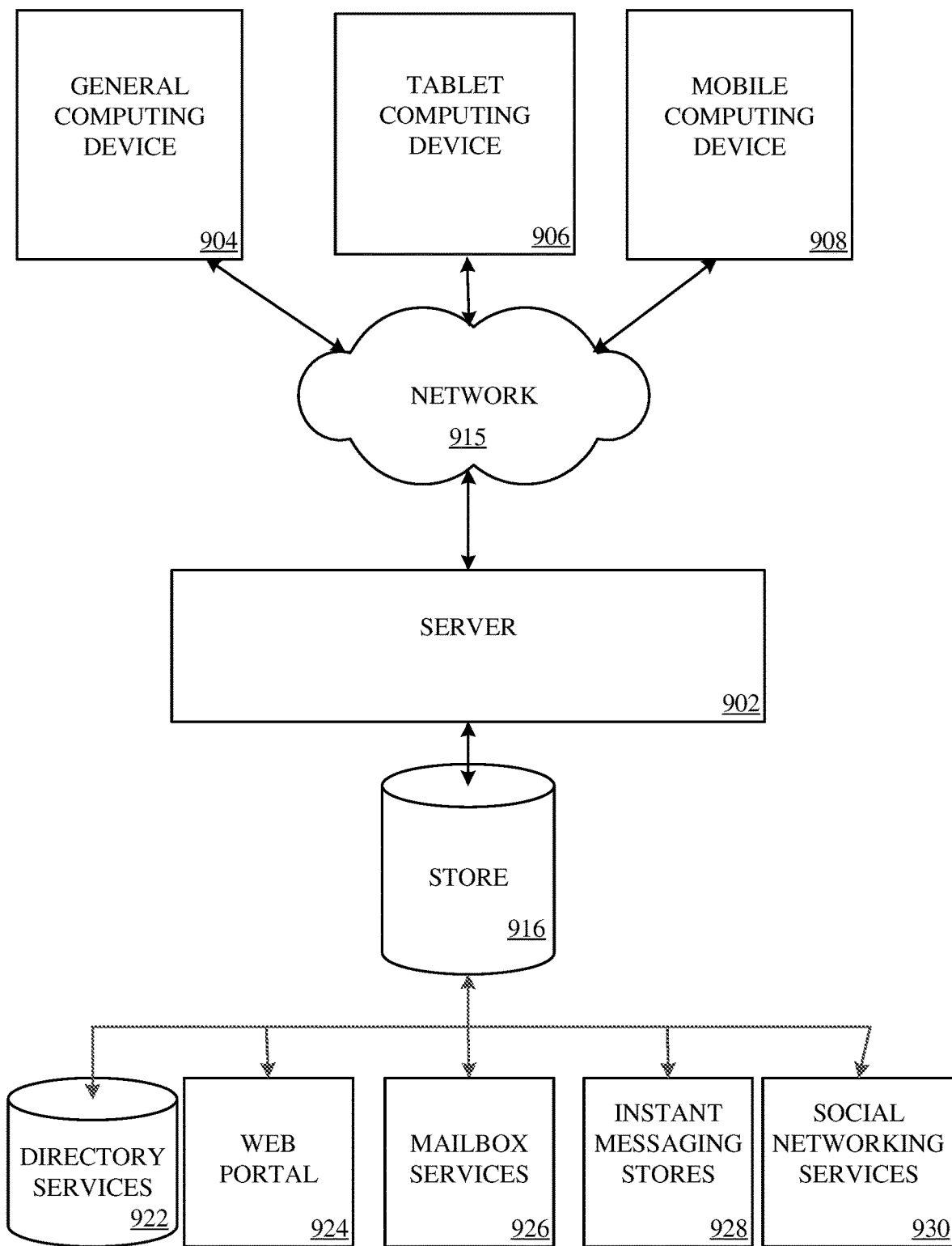
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above.

Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer systems described herein may be embodied in a personal/general computer 904, a tablet computing device 906 and/or a mobile computing device 908 (e.g., a smart phone). Any of these embodiments of the computing devices may obtain content from the store 916, in addition to receiving graphical data usable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for remote code activation, the computer-implemented method comprising:
    probing, by a first device, a second device to identify at least:
        available software applications on the second device that are available to be remotely activated by the first device, and
        supported transports for communication between the first device and the second device;
    in response to the probing, obtaining, by the first device, an indication of the identified supported transports and the identified available software applications, wherein the identified available software applications comprise a particular software application;
    receiving, by the first device, an indication related to the particular software application;
    providing, by the first device in response to the indication, a graphical user interface comprising a first option to activate the particular software application on the second device;
    receiving, by the first device, a selection of the first option via the graphical user interface;
    identifying, by the first device, based at least in part on the identified supported transports, a plurality of compatible transports for transmitting a wake message to the second device;
    selecting, by the first device, a transport from the plurality of compatible transports for transmitting the wake message to the second device;
    generating, by the first device, the wake message having a payload comprising an indication to activate the particular software application of the available software applications; and
    transmitting, from the first device to the second device, the wake message over the transport, wherein in response to receiving the wake message over the transport, the second device executes the particular software application.

2. The computer-implemented method of claim 1, wherein the selecting the transport from the plurality of compatible transports comprises:
selecting the transport based on one or more device characteristics of the first device.

3. The computer-implemented method of claim 2, wherein the one or more device characteristics comprises one of a battery life, a location of the first device, a distance between the first device and the second device, or a combination thereof.

4. The computer-implemented method of claim 1, further comprising:
detecting, on the first device, a wake initiation comprising one of a user input, a timer, or an event.

5. The computer-implemented method of claim 1, further comprising:
selecting, on the first device, a second transport from the plurality of compatible transports;
transmitting, from the first device to the second device, the wake message over the second transport; and
coalescing, by the second device, a first instance of the wake message received over the transport with a second instance of the wake message received over the second transport to generate a single wake message.

6. The computer-implemented method of claim 1, wherein the first device comprises a first type of operating system and the second device comprises a second type of operating system.

7. The computer-implemented method of claim 1, further comprising:
validating, by the second device, an integrity of the wake message.

8. The computer-implemented method of claim 1, further comprising:
transmitting, from the second device to the first device, a response to the wake message, the response comprising output from the particular software application.

9. The computer-implemented method of claim 8, wherein the response is transmitted over the transport.

10. The computer-implemented method of claim 1, further comprising
probing, by the first device, the second device to identify one or more device characteristics, wherein selecting the transport comprises using an artificial intelligence model to select the transport based at least in part on the one or more device characteristics.

11. The computer-implemented method of claim 1, wherein the identifying a plurality of compatible transports comprises:
identifying matching transports available on the first device with the identified supported transports on the second device.

12. The computer-implemented method of claim 1, wherein the transport comprises one of BLUETOOTH, near-field communication (NFC), and a cellular network.

13. A system for remote code activation, the system comprising:
a memory for storing executable program code; and
a processor, functionally coupled to the memory, the processor being responsive to computer-executable instructions contained in the program code and operative to:
probe a remote device to identify at least:
available software applications on the remote device that are available to be remotely activated by the system, and
supported transports for communication between the system and the remote device;
in response to the probe, obtain an indication of the identified supported transports and the identified available software applications, wherein the identified available software applications comprise a particular software application;
receive an indication related to the particular software application;
provide, in response to the indication, a graphical user interface comprising a first option to activate the particular software application on the remote device;
receive a selection of the first option via the graphical user interface;
identify, based at least in part on the identified supported transports, a plurality of compatible transports for transmitting a wake message to the remote device;
select a transport from the plurality of compatible transports for transmitting the wake message to the remote device;
generate the wake message having a payload comprising an indication to activate the particular software application of the available software applications; and
transmit the wake message over the transport to the remote device, wherein the wake message is processed by the remote device such that the remote device executes the particular software application.

14. The system of claim 13, wherein the computer-executable instructions contained in the program code that make the processor operative to select the transport from the plurality of compatible transports comprises further computer-executable instructions that make the processor operative to:
select the transport based on one or more device characteristics of the system, wherein the one or more device characteristics of the system comprise one of a battery life, a location of the system, a distance between the system and the remote device, or a combination thereof.

15. The system of claim 13, wherein the computer-executable instructions contained in the program code comprise further computer-executable instructions that make the processor operative to:
detect a wake initiation comprising one of a user input, a timer, or an event.

16. The system of claim 13, wherein the computer-executable instructions contained in the program code comprise further computer-executable instructions that make the processor operative to:
select a second transport from the plurality of compatible transports; and
transmit the wake message over the second transport to the remote device, wherein the remote device coalesces a first instance of the wake message received over the transport with a second instance of the wake message received over the second transport to generate a single wake message.

17. The system of claim 13, wherein the computer-executable instructions contained in the program code that make the processor operative to identify a plurality of compatible transports comprises further computer-executable instructions that make the processor operative to:

identify matching transports between available transports on the system and the identified supported transports on the remote device.

18. A system for remote code activation, the system comprising:
- a memory for storing executable program code; and
- a processor, functionally coupled to the memory, the processor being responsive to computer-executable instructions contained in the program code and operative to:
  - detect a probing from a remote system, wherein the probing requests identification of available software applications for remote activation;
  - in response to the probing, provide an indication of the available software applications for remote activation;
  - receive a first instance of a wake message over a first transport from the remote system and a second instance of the wake message over a second transport from the remote system;
  - coalesce the first instance of the wake message with the second instance of the wake message to generate a single wake message, the single wake message indicating a particular software application from the available software applications; and
  - activate the particular software application, wherein the particular software application is not executing prior to the activation.

19. The system of claim 18, wherein the computer-executable instructions contained in the program code comprises further computer-executable instructions that make the processor operative to:
- validate an integrity of the single wake message.

20. The system of claim 18, wherein the computer-executable instructions contained in the program code comprises further computer-executable instructions that make the processor operative to:
- transmit, to the remote system, a response to the wake message, the response comprising output from the particular software application.

* * * * *